R. M. DRAVO & F. DONALDSON.
LINING FOR SHAFTS, &c.
APPLICATION FILED APR. 11, 1907.

971,734.

Patented Oct. 4, 1910.

WITNESSES.
J. R. Keller
Robert C. Totten

INVENTORS.
Ralph M. Dravo
& Francis Donaldson
By Kay, Totten & Winter
attorneys

UNITED STATES PATENT OFFICE.

RALPH M. DRAVO, OF EDGEWORTH, PENNSYLVANIA, AND FRANCIS DONALDSON, OF DAVENPORT, IOWA.

LINING FOR SHAFTS, &c.

971,734.  Specification of Letters Patent.  Patented Oct. 4, 1910.

Application filed April 11, 1907. Serial No. 367,568.

*To all whom it may concern:*

Be it known that we, RALPH M. DRAVO, a resident of Edgeworth, in the county of Allegheny and State of Pennsylvania, and FRANCIS DONALDSON, a resident of Davenport, in the county of Scott and State of Iowa, have invented a new and useful Improvement in Linings for Shafts, &c.; and we do hereby declare the following to be a full, clear, and exact description thereof.

This invention relates to linings for shafts, wells and the like. Its object is to provide a shaft lining which is strong, durable or indestructible by decay or chemically, and which can be quickly put in place so as not to interfere with other work in the shaft.

In an application of even date herewith, Serial No. 367,566, there is described and claimed a shaft lining consisting of separate reinforced concrete members which are molded on the surface and then set up or assembled in the shaft, said lining comprising suitable ring beams, posts, cross struts and lagging. This application is one of the specific applications referred to in our application above identified and illustrates and claims a specific arrangement coming within the broad claims of the aforesaid application.

The invention comprises the construction and arrangement of parts hereinafter described and claimed.

Figure 1:
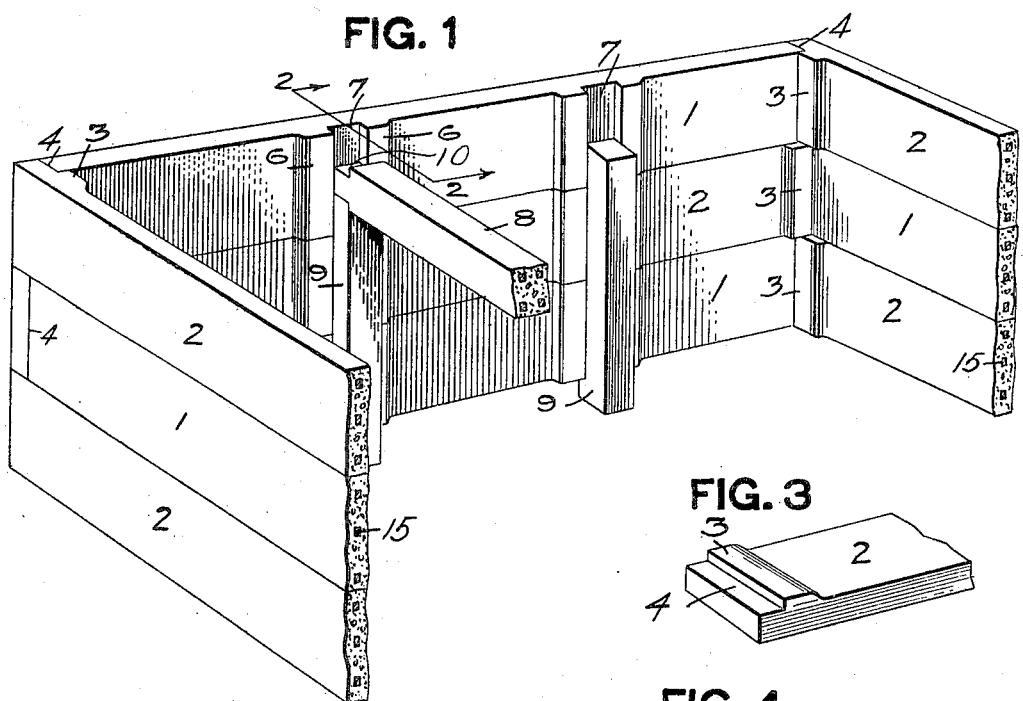
Figure 3:
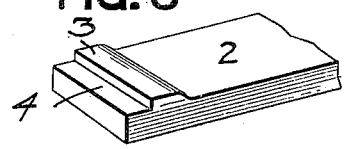
Figure 2:
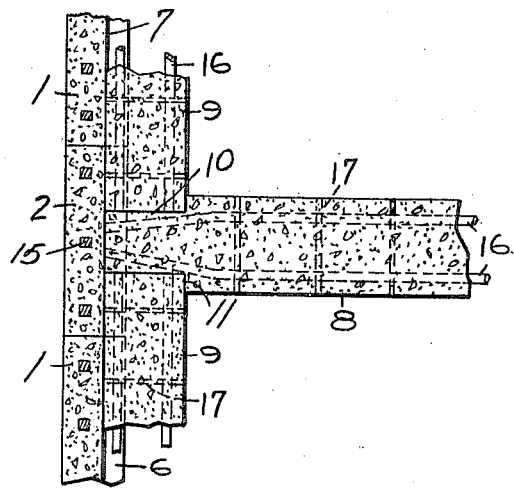

Figure 1 is a perspective view of a portion of the shaft lining; Fig. 2 is a vertical section on the line 2—2, Fig. 1; Fig. 3 is a perspective view of the end of a wall plate, and Fig. 4 is a perspective view showing a modification.

The shaft lining illustrated is composed entirely of built up sections formed of reinforced concrete. This lining comprises lagging or wall plates 1 and 2 arranged horizontally, as shown, and resting one upon the other. The wall plates 1 are formed with plain ends, as shown, while the wall plates 2 are provided on their inner faces with projections 3 forming near their ends with projections 3 forming a rabbet 4 for receiving the end of a plate 1. Consequently, these wall plates at the corners have mutual abutting shoulders which prevent the plates being forced inwardly. Preferably the plates 1 and 2 are arranged alternately, as shown in Fig. 1, so as to break joints at the corners. The side wall plates between the ends are provided with vertical ribs or projections 6, leaving between the same a groove 7 into which project the ends of the cross struts 8, these struts being held in position by posts 9 also seated in the groove 7 and receiving the ends of the struts between the same. Preferably the ends of the struts are reduced, as shown at 10, so as to provide shoulders 11 abutting against the side posts. These struts receive the usual guides for the cage.

Figure 4:
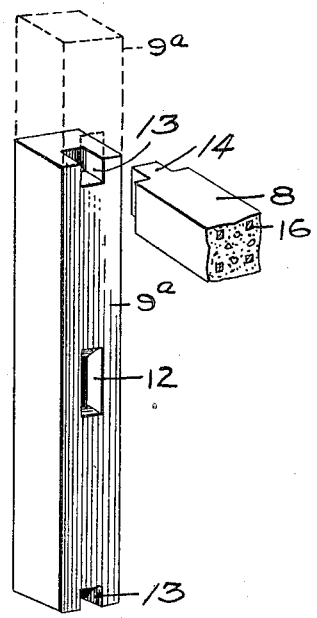

Fig. 4 shows a modification wherein the side posts 9ª, instead of being made of short sections receiving between the same the ends of the struts, are made of greater length and provided on their inner faces with sockets 12 and 13 for receiving tenons 14 on the ends of the struts.

All of the parts forming the shaft lining are formed of concrete reinforced by metal. The wall plates are preferably reinforced by means of longitudinal rods 15 and also if necessary by transverse loops or stirrups, or they may be reinforced by a suitable metal mesh, such as expanded metal. Ordinarily, however, simple longitudinal rods are sufficient. The posts and struts likewise are reinforced with metal, such as by means of the longitudinal rods 16 and transverse stirrups or loops 17, the latter serving principally as a means for properly spacing the longitudinal rods. All of these parts may be readily formed in suitably shaped molds and can be made of any size or shape to meet the conditions encountered. These parts are molded on the surface and allowed to thoroughly set and when a sufficient quantity is on hand and when the shaft is ready for the same they are lowered down into the shaft and set up or erected with a minimum amount of labor and quite expeditiously, it merely being necessary to assemble the parts in the manner illustrated in Fig. 1, and if necessary to fill in behind the wall plates with earth, rubble, or any other material on hand. Consequently, there will be no unnecessary interruption of other work in the shaft as is the case where it is attempted to build up concrete or masonry linings directly in the shaft.

While the lining is shown as applied to a vertical shaft, it obviously can be adapted to inclined shafts.

What we claim is:

1. A shaft lining composed of a plurality of layers of reinforced concrete plates horizontally arranged and provided with vertical grooves, vertically extending posts seated in said grooves, and cross reinforced concrete struts having end portions projecting between the meeting ends of the posts and seated in said grooves.

2. A shaft lining composed of a plurality of layers of horizontally arranged concrete reinforced plates provided with registering vertical ribs, reinforced concrete posts vertically seated between said ribs, and reinforced concrete struts having reduced end portions fitting between adjacent ends of said posts.

3. A shaft lining composed of a plurality of layers of horizontally arranged concrete plates, each layer being provided with ribs forming between the same a vertical groove in alinement with the like grooves in each of the other layers, said grooves being disposed intermediate the ends of each side of the shaft lining, and vertically arranged reinforced concrete posts in said grooves, each post extending through a plurality of said layers and terminating intermediate of a layer.

4. A shaft lining composed of a plurality of layers of horizontally arranged reinforced concrete plates, each layer being provided with ribs forming between the same a vertical groove in alinement with the like groove in each of the other layers, said grooves disposed intermediate the ends of each side of the shaft lining, vertically arranged reinforced concrete posts in said grooves, each post extending through a plurality of said layers and terminating intermediate of a layer, and reinforced concrete cross struts having reduced ends abutting in said grooves and seated between the ends of adjacent posts.

In testimony whereof, we the said RALPH M. DRAVO and FRANCIS DONALDSON, have hereunto set out hands.

RALPH M. DRAVO.
FRANCIS DONALDSON.

Witnesses:
  M. D. VOGEL,
  F. W. WINTER.